United States Patent [19]
Gonzalez

[11] Patent Number: 5,191,914
[45] Date of Patent: Mar. 9, 1993

[54] REDUNDANT VALVE DISCONNECT COUPLING

[75] Inventor: Antonio E. Gonzalez, La Mirada, Calif.

[73] Assignee: Fairchild Space and Defense Corporation, Germantown, Md.

[21] Appl. No.: 708,056

[22] Filed: May 30, 1991

[51] Int. Cl.⁵ .............................................. F16L 29/00
[52] U.S. Cl. ................................. 137/614.03; 137/614
[58] Field of Search ............... 137/614, 614.03, 614.04

[56] References Cited

U.S. PATENT DOCUMENTS

| | | | |
|---|---|---|---|
| 3,645,294 | 2/1972 | Allread | 137/614 X |
| 4,509,554 | 4/1985 | Failla | 137/614.04 X |
| 4,597,413 | 7/1986 | Bureth | 137/614.04 |
| 4,944,329 | 7/1990 | Cardin et al. | 137/614 X |

Primary Examiner—John C. Fox
Attorney, Agent, or Firm—Michael W. York

[57] ABSTRACT

A redundant fluid coupling with two coupling assemblies adapted to engage each other and permit fluid flow between the coupling assemblies when they are connected. Each coupling assembly has two functionally independent valves for closing off the fluid flow from the coupling assembly when the coupling assemblies are disconnected. The independent valves are reciprocally operated by coil springs and since they are functionally independent, the failure of one valve of the coupling assembly to operate will not affect the operation of the other valve. The interior portions of each coupling assembly are pivotally mounted which permits the coupling assemblies to be connected together even though they may be offset from each other and/or form an angle with each other.

8 Claims, 4 Drawing Sheets

REDUNDANT VALVE DISCONNECT COUPLING

BACKGROUND OF THE INVENTION

Quick disconnect couplings have been in use numerous years and in general they comprise two valve members that are adapted to be coupled together whose valves are automatically opened to permit fluid flow through when they are connected and are automatically closed when the valve members are disconnected or no longer coupled together. Such couplings are particularly useful in transferring a liquid to or from one container to another such as in fueling or refueling operations associated with rockets and spacecraft.

Unfortunately, if one or both such valves should malfunction or remain open when the coupled valve members are disconnected this can result in the rapid draining of the fluid contents in the adjacent container through the defective valve. Such an incident can have serious consequences since fluids used with such quick disconnects are in many cases highly corrosive, toxic, inflammable, or explosive or a combination of these. In fact, the malfunctioning of a quick disconnect associated with a Titan missile resulted in the destruction of the missile, its silo, and the serious injury and death of one of the individuals involved in draining oxidizer from the missile. Consequently, it is imperative that quick disconnects have valves that function properly to prevent leaking when the valve members are being disconnected.

Quick disconnect valves can malfunction when something in the fluid passing through the valve lodges in the valve causing it to remain fully or partially open when the valve is disconnected from the other mating valve. This, of course, can result in the leaking of fluid with potentially serious consequences. Also, if the valve seat or valve sealing surfaces are defective this can also result in leaking of the valve.

Attempts to eliminate these problems have been made in the past. Some of these have involved the use of multiple seals in a single poppet. This solution is satisfactory in the case where only one of the seals is defective or becomes damaged. However, if a contaminant particle in the fluid lodges under the poppet and prevents it from reaching its seated position neither one of the seals will function properly.

Another attempted solution has been to add a complete additional valve in series with the quick disconnect valves. While this arrangement appears to function satisfactorily from a safety view point, it increases substantially the amount of spillage (volume between the two valves) and it adds substantially to the complexity of the valve system, to its weight and, of course, to its cost. Consequently, such a solution would not be acceptable for many situations particularly those that are to be used in space or military operations or where cost is a significant consideration.

This invention overcomes these problems associated with previous quick disconnect type valve systems. With this redundant valve disconnect coupling invention it is almost impossible for at least one the valves not to close to stop all fluid flow through the valves when the coupling is disconnected. The redundant valve disconnect coupling invention has two separate independent valves in each coupling half that are nevertheless operated together by the single action of coupling the valves together or by disconnecting them. Consequently, even if one poppet should be stuck open the coupling half will still not leak in view of the closure of the other separate totally independent valve. Each coupling half also has three independent fluid sealing surfaces in the mating (interface) area so that the failure of one surface such as by a scratch, etc. will not affect the others. Finally, this disconnect coupling design offers the flexibility of being capable of mating under a rather large misalignment and offset while maintaining all other capabilities intact.

BRIEF DESCRIPTION OF THE INVENTION

This invention relates to quick disconnect couplings and more particularly to quick disconnect couplings having provisions for the failure of one of the valves in the coupling to operate properly.

Accordingly, it is an object of the invention to provide a redundant valve disconnect coupling that will not leak.

It is an object of the invention to provide a redundant valve disconnect coupling that has redundant leak preventing provisions in each coupling portion.

It is an object of the invention to provide a redundant valve disconnect coupling having two independent valves in each coupling portion.

It is an object of the invention to provide a redundant valve disconnect coupling with two independent valves in each coupling portion in which the failure of one valve does not affect the operation of the other valve.

It is an object of the invention to provide a redundant valve disconnect coupling in which each coupling portion has a plurality of valve sealing surfaces.

It is an object of the invention to provide a redundant valve disconnect coupling having three sealing surfaces that are spaced apart to prevent an ingested particle from affecting a plurality of sealing surfaces.

It is an object of the invention to provide a redundant valve disconnect coupling that is reliable in its operation.

It is also an object of the invention to provide a redundant valve disconnect coupling that is simple in its operation.

It is also an object of the invention to provide a redundant valve disconnect coupling having few moving parts.

It is an object of the invention to provide a redundant valve disconnect coupling having simple spring biased reciprocating moving parts.

It is also an object of the invention to provide a redundant valve disconnect coupling that is suitable for use at low temperatures.

It is also an object of the invention to provide a redundant valve disconnect coupling that is designed for use with cryogenic fluids.

These and other objects are obtained from the present redundant valve disconnect coupling invention that includes a pair of coupling members adopted to engage each other along an axis to permit fluid flow between the coupling members when they are engaged. Each coupling member has a body with a plurality of spaced apart valve seats located in the body and a plurality of reciprocating independent valve members adapted to make sealing contact with the spaced apart valve seats located in the body. Each coupling member also has a compression coil spring for biasing the reciprocating valve members into contact with the respective spaced apart valve seats located in the body when the coupling members are disconnected.

BRIEF DESCRIPTION OF THE DRAWINGS

The invention will be hereinafter more fully described with references to the accompanying drawings in which.

DETAILED DESCRIPTION OF THE PREFERRED EMBODIMENT

Figure 1:
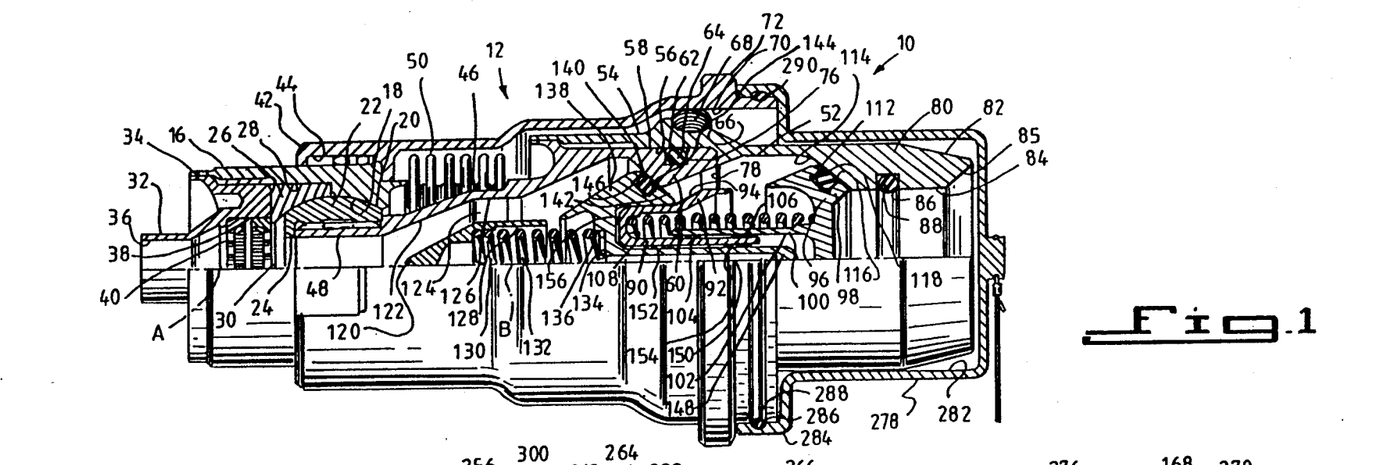
FIG. 1 is an elevational view partly in section of the male coupling assembly of the redundant valve disconnect coupling invention.
Figure 2:
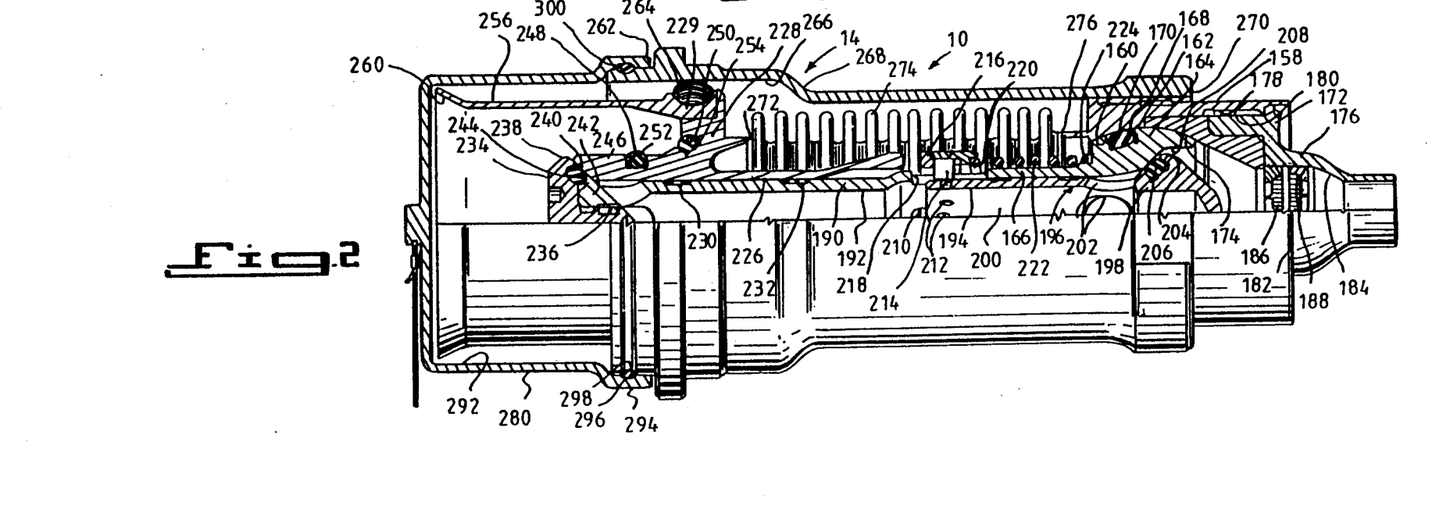
FIG. 2 is an elevational view partly in section of the female coupling assembly of the coupling invention that is adapted for use with other coupling assembly set forth in FIG. 1.

The redundant valve coupling invention is illustrated in FIGS. 1 and 2 and is designated generally by the number 10. The redundant valve coupling 10 comprises a male coupling assembly 12 illustrated in FIG. 1 and a female coupling assembly 14 illustrated in FIG. 2. The male coupling assembly 12 comprises a generally cylindrical hollow body member 16 with a curved substantially spherical shaped inner surface 18 that slidably receives the corresponding exterior substantially spherical curved exterior surface 20 of a rotatable swivel member 22 that has a central circular aperture 24. A cylindrical swivel retaining member 26 is pressed into an interior recess 28 in the body member 16 to retain the swivel member 22 in place within the body member 16. The swivel retaining member 26 has a central aperture 30 located adjacent to the aperture 24 of the swivel member 22. A generally cylindrical hollow end fitting 32 is threaded into place within the threaded opening 34 of the body member 16 and the fitting 32 has a central circular shaped central passage 36. The end fitting 32 also has a central recess 38 adjacent the passage 36 that holds a fluid filter 40.

As illustrated in FIG. 1, the male coupling assembly 12 has a generally cylindrical hollow housing member 42 that has a threaded interior aperture 44 that is threadably connected to threads on the exterior surface of the body member 16. The housing member 40 surrounds a generally cylindrical hollow body assembly 46 that has an inner cylindrical portion 48 that is threaded to the circular hole 24 in the swivel member 22. A generally cylindrical hollow bellows 50 surrounds the body assembly 46 section adjacent the inner cylindrical portion 46 and the ends of the bellows 50 are connected to the body member 16 and the body assembly and hence this bellows 50 effectively seals the joint between the outer slideable surface of the swivel member 22 and the body member 16. In view of this arrangement, the swivel member 22 can be rotated within the curved inner surface 18 of the body member 16 due to the flexing of the bellows 50 so that the long axis B of the body assembly 46 can be tilted or make an acute angle with respect to the long axis A of the body member 16 and yet the joint between the body member 16 and the body assembly 46 is sealed by the bellows 50.

A generally cylindrical hollow head member 52 has an integral inner end or skirt end portion 54 with an aperture 56 sized and shaped so that it slides over the adjacently located outer surface 58 of the seat end portion 60 of the body assembly 46. The outer surface 58 has a circumferential ring 62 located in it that is adapted to receive a circular shaped flexible O-ring 64 that provides a fluid tight seal between the outer surface 58 of the body assembly 46 and the surface of the aperture 56. The outer surface of the portion 54 of the head member 52 has a circumferential ring 66 that is sized and shaped to receive a circular shaped garter spring 68. The garter spring 68 pushes against the inner surface 70 of the outer portion 72 of the housing member 42.

As also illustrated in FIG. 1, the circumferential seat end portion 60 of the body assembly 46 has an outer surface 76 that is sized and shaped to butt up against a corresponding generally conforming seating ring 78 located in the center portion of the hollow head member 52 and serves to limit inward travel of the head member 52. The head member 52 has an outer cylindrical portion 80 with a tapering end 82 and an internal generally cylindrical bore or hole 84 with an outer flared or countersunk entrance portion 85. An internal circumferential groove 86 is located in the bore 84 and it is sized and shaped to receive a flexible O-ring 88. The seat end portion 60 of the body assembly 46 has a centrally located generally cylindrical guide portion 90. This guide portion 90 is supported and held in place by the guide web 92 that connects the guide portion 90 to the seat end portion 60 and a series of holes, such as the hole 94, are located in the guide web 92 to permit the passage of fluid around the guide portion 90 within the hollow head member 52.

It will be noted that a primary poppet member 96 is located inside the hollow head member 52 and that this poppet member 96 has a generally cylindrical poppet head portion 98 and a generally cylindrical elongated poppet stem 100 that is integral with and extends outward to the rear of the poppet head portion 98. The poppet stem 100 has a centrally located hole 102 that is sized and shaped to slidably slip over the guide portion 90 of the head member 52. It will be noted that two guide rings 104 and 106 are located around the guide portion 90 inside the hole 102. A circular shaped recess 108 is located in the seat end portion 60 immediately adjacent the guide portion 90 and one end of a coil spring 110 is located in and pushed against the bottom of this recess 108. This spring 110 is located around the guide portion 90 and the poppet stem 100 and its outer end pushes and exerts an outward force against the inner sides of the poppet head 98. The poppet head 98 has a tapering circumferential sealing surface 112 that is sized and shaped to engage a substantially similar sealing surface 114 on the inside of the outer cylindrical portion 80 of the head member 52. A circular shaped groove 116 is located in the surface 112 and a flexible O-ring 118 sealingly engages the surface 114 as the poppet head 98 is urged outward due to the force of the coil spring 110.

As illustrated in FIG. 1, the body assembly 46 has a generally cylindrical spring guide and support portion 120 located in the center of the aperture 122 of the body assembly 46. The spring guide and support portion 120 has four (only one of which is shown) support webs 124 located around its periphery that connect the guide and support portion 120 to the adjacent wall 126 of the aperture 122. As illustrated, the guide and support portion 120 has a centrally located generally circular shaped blind hole 128 that is sized and shaped to receive and guide the inner end portion 130 of a poppet coil spring 132. The outer end portion 134 of this poppet coil spring 132 fits into the aperture 136 in the base of a generally cylindrical shaped secondary poppet head member 138 so as to exert an outward force on the poppet head member 138. The poppet head member 138 has a generally circular cone shaped outer sealing surface 140 that is sized and shaped to abut up against a complimentary generally circular cone shaped sealing surface 142 on the body assembly 46. The sealing surface 140 has a circular groove 144 in it that is sized and shaped to receive a flexible O-ring 146 that presses up against the sealing surface 142 to provide a fluid seal between the surfaces 140 and 142.

As illustrated in FIG. 1, the poppet head member 138 has a generally cylindrical projection 148 extending from its forward portion and this projection 148 is sized and shaped to slidably fit within a complimentary centrally located hole 150 in the body assembly 46. Two guide rings 152 and 154 are located around this projection 148 to assist in guiding and locating the projection in the hole 150. In view of this arrangement with the projection 148, associated hole 150, and the guide rings 152 and 154, the poppet head member 138 is properly located within the body assembly 46. It will also be noted that a wide circular shaped groove 156 is located around the base of the projection 148 so that a portion of the poppet head member 138 can fit around a portion of the body assembly 46.

FIG. 2 shows the female coupling assembly 14 that is designed to be used in connection with the previously described male coupling assembly 12. The female coupling assembly 14 comprises a generally cylindrical hollow body member 158 with a curved substantially spherical shaped inner surface 160 that slidably receives the corresponding exterior generally spherical shaped surface 162 of the head portion 164 of a poppet seat member 166. The spherical shaped exterior surface 162 has a ring shaped groove 168 in it that is sized and shaped to receive a flexible O-ring 170 that provides a fluid tight seal between the sliding surfaces 160 and 162. A hollow generally cylindrical shaped retainer stem member 172 has an inner surface portion 174 that is sized and shaped to receive a portion of the spherical shaped exterior surface 162 of the head portion 164 of the poppet seat member 166. In view of this arrangement of the substantially spherical surfaces 160, 162 and 174, the head portion 164 of the poppet seat member 166 is free to rotate within a limited degree within the body member 158 and the retainer stem member 172.

A hollow generally cylindrical shaped end fitting 176 has a threaded inner end portion 178 that is threaded into a corresponding threaded end portion 180 in the body member 158 so as to retain the retainer stem member 172 and the associated head portion 164 of the poppet seat member 166 in place within the body member 158. The end fitting 176 has a generally cylindrical shaped recess 182 in its interior aperture 184 that is sized and shaped to receive a generally cylindrical shaped fluid filter 186 that is retained in place by the shoulder 188 and by being pressed up against the end of the retainer stem member 172 when the end fitting 176 is secured in place in the threaded end portion 180 of the body member 158.

As illustrated in FIG. 2, the poppet seat member 166 has an elongated substantially cylindrical hollow stem portion 190 that has a substantially circular cross section hole 192 extending through it. The inner portion of the hole 192 is sized and shaped to slidably receive the stem portion 194 of a poppet member 196 that has an enlarged head portion 198. The stem portion 194 has a substantially circular hole 200 extending through it that terminates or is closed off in the head portion 198. A series of spaced apart holes 202 extend through the stem portion 194 adjacent the head portion 198 and provide fluid passages from the hole 200 to outside the stem portion 194.

The head portion 198 of the poppet member 196 has an inner circumferential recess 204 that is sized and shaped to receive a flexible O-ring 206. This O-ring 206 is located to push up against a sloping circumferential sealing surface 208 on the interior of the head portion 164 of the poppet seat member 166 to provide a fluid tight seal when the head portion 198 is in its seated position. The outer end portion 210 of the stem portion 194 of the poppet member 196 has a series of circumferential holes 212 that are sized and shaped to receive the inner end portions of retaining pins 214 that retain a generally circular shaped retaining ring 216 to the outer end portion 210 of the stem portion 194. It will be noted that slots, such as the slot 218, are provided in the hollow stem portion 190 that permit the retaining pins, such as the pin 214, to pass through the stem portion 190. The slots, such as the slot 218, also permit the associated pins, such as the pin 214, to move back and forth within them. The retaining ring 216 has a recess 220 that receives one end of a coil spring 222 whose opposite end pushes up against a circumferential shoulder 224 on the head portion 164 of the poppet seat member 166. This spring 222 pushes against the retaining ring 216 which in turn, in view of the retaining pins, such as the pin 214, causes the poppet member 196 to be biased to the left, as illustrated in FIG. 2, to normally cause the O-ring 206 to contact the sealing surface 208.

As illustrated in FIG. 2, the stem portion 190 of the poppet member 196 slides within a hole 226 in a dynamic head member 228 that is sized and shaped to receive the stem portion 190 and the stem portion 190 is guided by the guide rings 230 and 232 that surround the stem portion 190. The outer end portion of the stem portion 190 is closed by a seal retainer member 234 that is secured to the end of the end portion of the stem portion 190 in a manner well known to those skilled in the art. However, even though the end of the end portion of the stem portion 190 is closed by the seal retainer member 234, a plurality of apertures, such as the aperture 236 are located in the wall of the stem portion 190 adjacent the seal retainer member 234. The seal retainer member 234 has an outer circumferential lip 238 that serves to secure a flexible O-ring 240 between it and the adjacent end 242 of the stem portion 190. The O-ring 240 is located to normally contact and press against the sloping circumferential sealing surface 244 on the outer projecting portion 246 of the dynamic head member 228.

The projecting portion 246 of the dynamic head member 228 has two spaced apart circumferential grooves 248 and 250 in its outer surface that are sized and shaped to receive the respective flexible O-rings 252 and 254. The dynamic head member 228 is surrounded by and connected to a hollow generally cylindrical shroud 256 whose inner end is secured in a circumferential recess 229. The outer end 260 of the shroud 256 is flared outward and a circumferential groove 262 is located around the outside surface of the shroud 256 that is sized and shaped to receive a garter spring 264. This garter spring 264 also presses up against the inner surface of a hole 266 in a generally cylindrical housing member 268 whose inner end portion 270 is rigidly secured to the outside surface of body member 158 by means well known to those skilled in the art.

As illustrated in FIG. 2, the outer end portion 272 of a bellows 274 is rigidly secured to the dynamic head member 228 in a manner well known to those skilled in the art and the inner end portion 276 is rigidly secured in the same manner to the outer portion of the body member 158. This bellows 274, due to its accordion-like construction and ability to contract and expand, allows reciprocal movement of the dynamic head member 228 as well as the associated shroud 256. This bellows 274 in conjunction with the sliding substantially spherical surfaces 160 and 162 as well as the flexible garter spring 264 allows rotation to a limited degree of the poppet seat member 166 so that the elongated central axis D of the stem portion 190 can form an acute angle with the central axis C of the body member 158. The bellows 274 also provides a fluid tight seal between the dynamic head member 228 and body member 158.

As illustrated in FIGS. 1 and 2, both the male coupling assembly 12 and the female coupling assembly 14 have respective generally cup-shaped protective covers 278 and 280. As illustrated in FIG. 1, the protective cover 278 for the male coupling assembly 12 has an interior opening 282 that is sized and shaped to fit over and protect the outer cylindrical portion 80 of the head member 52. The cover 278 has a rim portion 284 with a circumferential groove 286 in its inner surface that is sized and shaped to receive a flexible O-ring 288 that presses into a corresponding circumferential groove 290 in the outer portion 72 of the housing 42 to hold the cover 278 in place to protect the cylindrical portion 80.

In a similar manner, as illustrated in FIG. 2, the protective cover 280 for the female coupling assembly 14 has an interior opening 292 that is sized and shaped to fit over and protect the shroud 256. The cover 280 has a rim portion 294 with a circumferential groove 296 that is sized and shaped to receive a flexible O-ring 298 that presses into a corresponding circumferential groove 300 in the outer portion of the housing 270 to hold the cover 280 in place to protect the shroud 256.

The manner in which the redundant valve coupling 10 is used and how it functions is best understood by referring sequentially to FIGS. 3 through 6. Prior to connecting the male coupling assembly 12 and the female coupling assembly 14, the respective protective covers 278 and 280 illustrated in FIGS. 1 and 2 are first removed usually manually if they are present. This is accomplished by manually just pulling outward on the protective covers 278 and 280. Then the male coupling assembly 12 and the female coupling assembly 14 are brought toward each other to the positions indicated in FIG. 3 where they make initial contact.

Figure 3:
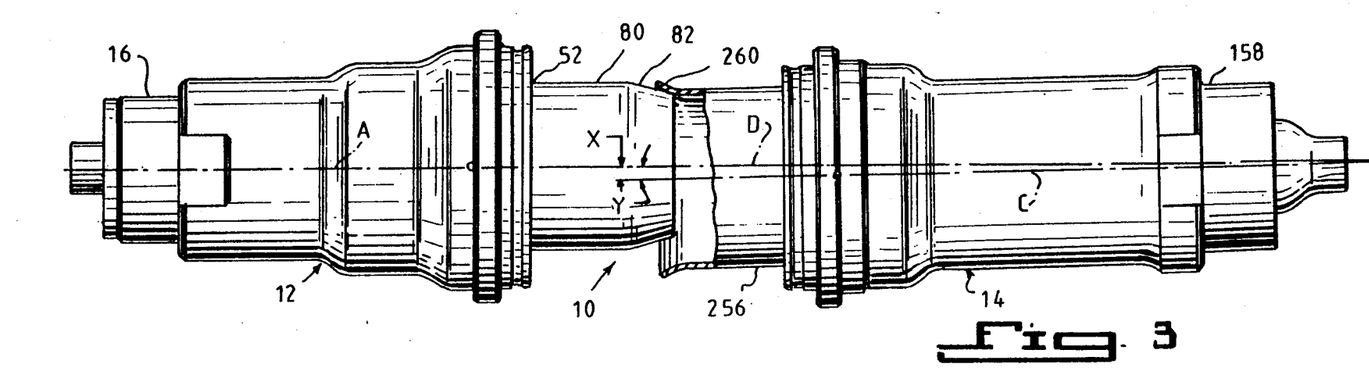
FIG. 3 is an elevational view of the coupling assemblies of the redundant valve disconnect coupling invention set forth in FIGS. 1 and 2 as the coupling assemblies are about to engage each other with the assemblies being misaligned by being displaced laterally and by having their long axes forming an acute angle with respect to each other.

As indicated in FIG. 3, the tapering end 82 of the outer cylindrical portion 80 of the head member 52 of the male coupling assembly 12 contacts the inside surface of the outer flared end 260 of the shroud 256 of the female coupling assembly 14. It should be noted that the long central axis A of the body member 16 of the male coupling assembly 12 is misaligned with the long central axis C of the body member 158 of the female coupling assembly 14. It will be noted that these axes are spaced from each other laterally by a distance X and that they also form an acute angle Y with respect to each other. As indicated, the flared end 260 serves to guide the tapering end 82 toward the central axis D of the stem portion 190 of the poppet member 196 illustrated in FIG. 2.

Figure 4:
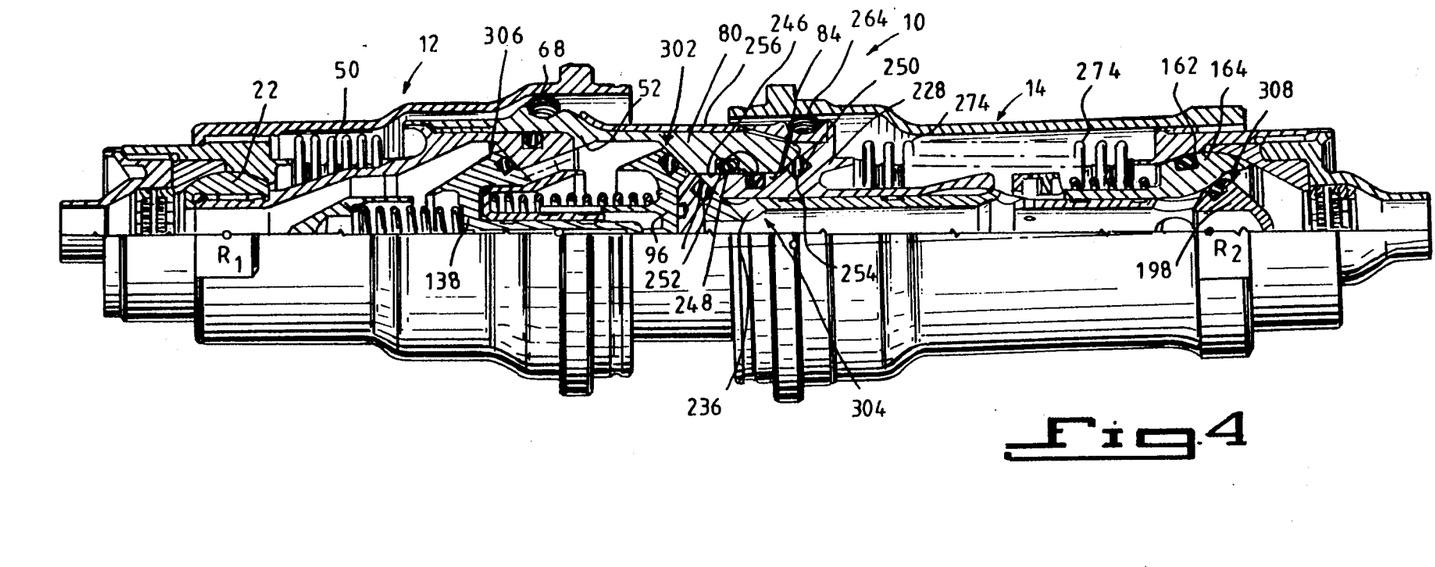
FIG. 4 is an elevational view partly in section of the coupling assemblies set forth in FIG. 3 as the assemblies move into further engagement so that their interface seals are engaged but the primary and secondary poppets are closed.

To continue the connecting process the male and female coupling assemblies 12 and 14 are pushed further toward each other through suitable means known in the art such as manually so they reach the positions indicated in FIG. 4. As indicated in FIG. 4, the male and female coupling assemblies 12 and 14 have been moved closer toward each other so that the cylindrical portion 80 of the head member 52 of the male coupling assembly 12 slips into the shroud 256 of the female coupling assembly 14 so that the hole 84 in the cylindrical portion 80 receives the projecting portion 246 of the dynamic head member 288 of the female coupling assembly 14.

In this position the O-rings 252 and 254 in the grooves 248 and 250 in the projecting portion 246 of the dynamic head member 228 press up against the adjacent surfaces of the hole 84 and the countersunk entrance portion 85 of the cylindrical portion 80 of the head member 52 to create a fluid tight seal between the cylindrical portion 80 of the head member 52 of the male coupling assembly 12 and the projecting portion 246 of the dynamic head member 228 of the female coupling assembly 14. As illustrated in FIG. 4, both the primary poppet valves 302 and 304 comprising respectively the primary poppet member 96 and the projecting portion 246 and the associated aperture 236 and the secondary poppet valves 306 and 308 comprising the poppet head member 138 and the enlarged head portion 198 of the respective male and female coupling assemblies 12 and 14 are closed and consequently, there is no fluid path between the two coupling assemblies 12 and 14.

Figure 5:
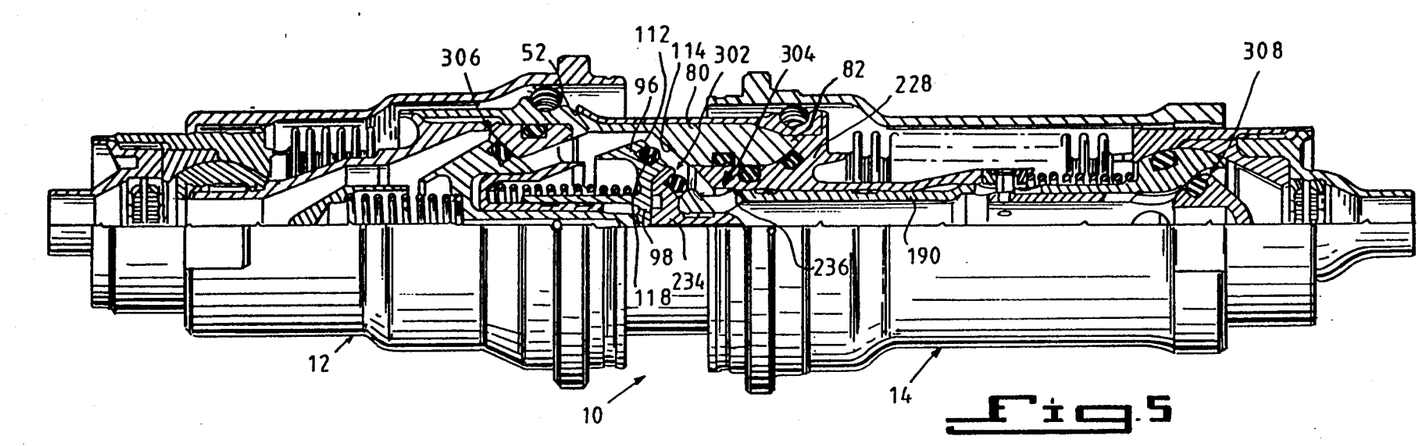
FIG. 5 is an elevational view partly in section of the coupling assemblies illustrated in FIGS. 3 and 4 with the coupling assemblies in their intermediate engagement condition with the primary poppets of both assemblies being open, but the secondary poppets remaining closed.

In the process of connecting the male and female coupling assemblies 12 and 14 together, the coupling assemblies continue to be moved toward each other by means known in the art such as through the use of couplings mounted to a carrier plate (not shown) pushed together by means of an electrical motor or hydraulic cylinder (not shown) and they reach the positions indicated in FIG. 5. As indicated in FIG. 5, the tapering end 82 of the outer cylindrical portion 80 pushes up against the dynamic head member 228 and pushes it to the right as it is viewed in FIG. 5. This results in the apertures, such as the aperture 236 in the wall of the stem portion 190 being uncovered. As illustrated, the retainer member 234 pushes up against the poppet head portion 98 of the poppet member 96 and compresses the coil spring 110 which causes the head portion 98 to move to the left as it is viewed in FIG. 5. This results in the sealing surface 11 of the poppet head portion 98 and the O-ring 118 moving away from the adjacently located sealing surface 114 on the inside of the outer cylindrical portion 80 of the head member 52. Consequently, as illustrated in FIG. 5 both primary poppet valves 302 and 304 of the respective male and female coupling assemblies 12 and 14 are open. However, the respective secondary poppet valves 306 and 308 remain closed.

Figure 6:
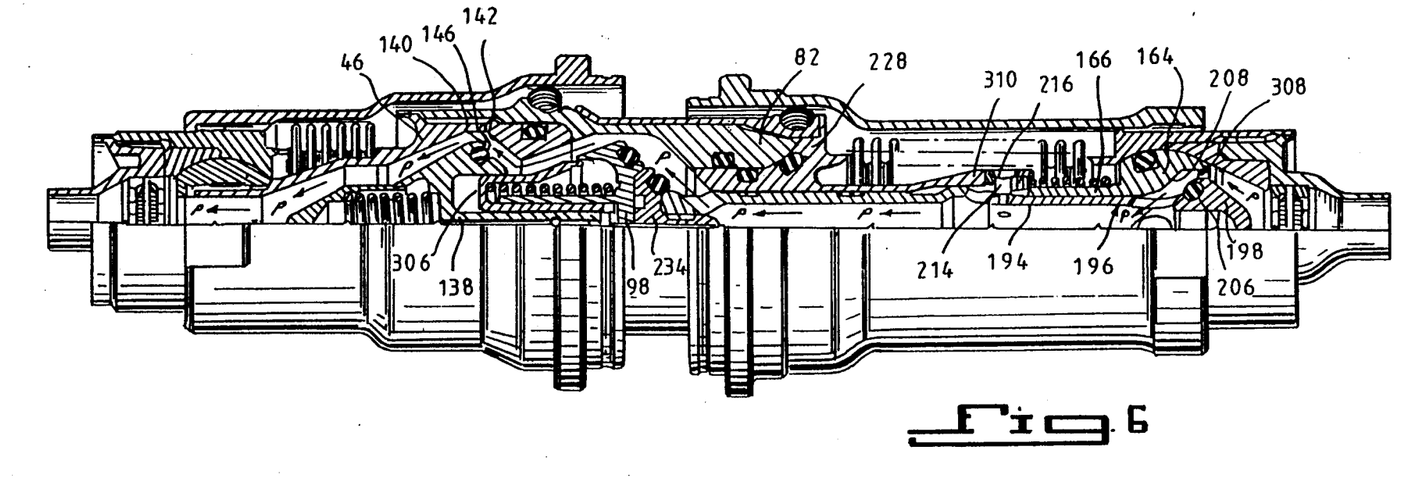
FIG. 6 is an elevational view partly in section of the coupling assemblies illustrated in FIGS. 3 through 5 with the coupling assemblies in their fully engaged positions with all poppets being open.

To continue the connecting process, the male and the female coupling assemblies 12 and 14 are moved even more toward each other until they reach the positions indicated in FIG. 6. As indicated in FIG. 6, continued pressure by the retainer member 234 against the poppet head portion 98 of the poppet member 96 results in the head portion 98 pushing against the poppet head member 138 that causes it to be moved to the left as illustrated in FIG. 6 so that its sealing surface 140 and the O-ring 146 moves away from the sealing surface 142 on the body assembly 46 and consequently, the secondary poppet valve 306 is opened. Movement of the tapering end 82 to the right also results in the movement of the dynamic head member 228 to the right as viewed in FIG. 6 so that its inner end portion 310 moves up against and pushes against the retaining ring 216. This results in the retaining ring 216 moving to the right and in view of the pins, such as the pin 214, that engages the stem portion 194 the poppet member 196 and its enlarged head portion 198 also moves to the right as illustrated in FIG. 6. This results in the O-ring 206 on the head portion 198 being moved away from the sloping sealing surface 208 on the interior of the head portion 164 of the poppet seat member 166 and consequently, the secondary poppet valve 308 of the female coupling assembly 14 is also opened.

FIG. 6 illustrates the male and female coupling assemblies in their fully coupled or connected positions. As illustrated, both the primary and secondary poppet valves 302 and 306 of the male coupling assembly 12 and the primary and secondary poppet valves 304 and 308 of the female coupling assembly 14 are all open. This permits fluid to pass through the coupling assemblies 12 and 14 through the passage way illustrated by the arrows P.

In order to disconnect the male and female coupling assemblies 1 and 14 of the redundant valve coupling 10 the aperture previously described with respect to FIGS. 3 through 6 is reversed. Initially, the male and female coupling assemblies are in their connected positions illustrated in FIG. 6. The male and female coupling assemblies 12 and 14 are then pulled outward or away from each other manually or by other suitable means known in the art. This results in the male and female coupling assemblies 12 and 14 assuming the positions indicated in FIG. 5 where both secondary poppet valves 306 and 308 of the respective male and female coupling assemblies 12 and 14 are closed which normally prevents fluid from flowing through either of the coupling assemblies 12 or 14. However, both of the primary poppet valves 302 and 304 remain open which is possible since the respective primary poppet valves 302 and 304 are independent of the respective secondary poppet valves 306 and 308.

The disconnecting process is continued by continuing to move the male and female coupling assemblies 12 and 14 outward or away from each other manually or through other means known in the art. This normally results in the primary poppet valves 302 and 304 also closing as indicated in FIG. 4 where both of the secondary poppet valves 306 and 308 are closed as are the primary poppet valves 302 and 304. This, of course, prevents fluid from passing through either of the male or female coupling assemblies 12 or 14. The disconnecting process is then continued by moving the male and the female coupling assemblies 12 and 14 outward or away from each other where they become physically detached from each other as indicated in FIG. 3. After the male and the female coupling assemblies 12 and 14 are physically separated, the protective covers 278 and 280 can be placed on the respective male and female coupling assemblies 12 and 14 to protect their outer end portions when they are not in use as illustrated in FIGS. 1 and 2.

During the disconnecting operation that was just discussed in relation to FIGS. 3 through 6, it is possible that contamination in the fluid that has been transferred through the redundant valve coupling 10 can result in contamination particles lodging in the redundant valve coupling 10. This possibility is illustrated in FIGS. 7 and 8 that are enlarged views of the respective primary and secondary poppet valves 302, 306 and 304, 308 of the respective male and female coupling assemblies 12 and 14 of the redundant valve coupling 10 illustrated in FIG. 4.

Figure 7:
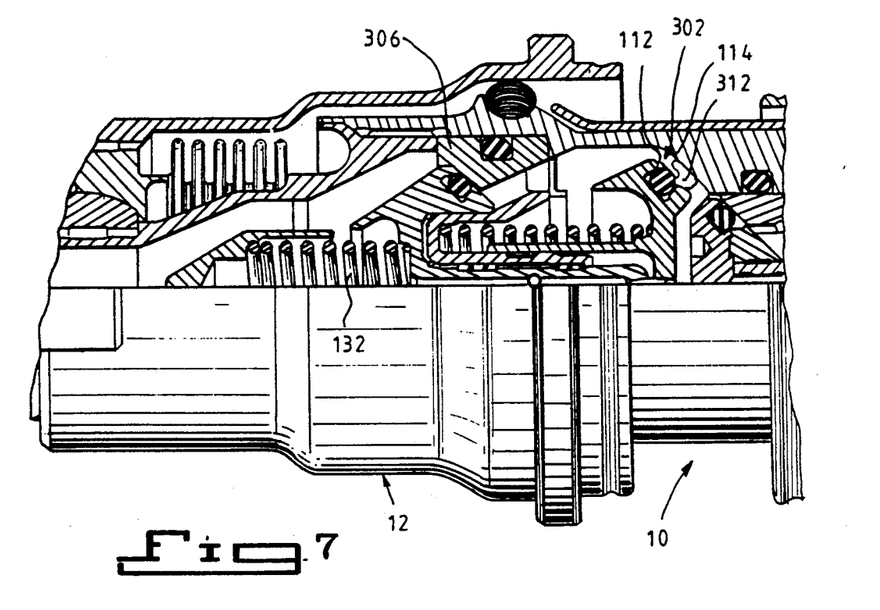
FIG. 7 is an enlarged view of a portion of one of the coupling assemblies illustrated in FIG. 4 illustrating the malfunction of one of the poppet valves.

As illustrated in FIG. 7 which is an enlarged view of the primary and secondary poppet valves 302 and 306 of the male coupling assembly 12 illustrated in FIG. 4, a particle of some type of foreign matter 312 has lodged between the valve surfaces 112 and 114 preventing them from contacting each other and has resulted in the primary poppet valve 302 of the male coupling assembly 12 being kept open. However, as illustrated in FIG. 8, the secondary poppet valve 306 of the male coupling assembly 12 does not have any such foreign matter and it is closed since it has its own closure spring 132 and operates totally independently of the primary poppet valve 302. Since both the primary and secondary poppet valves 302 and 304 of the male coupling assembly 12 are totally functionally independent, if the particle of foreign matter 310 had lodged in the secondary poppet valve 306, the primary poppet valve 302 would have still functioned. Consequently, as long as either the primary poppet valve 302 or the secondary poppet valve 306 functions the male coupling assembly 12 will function to prevent the flow of fluid when it is disconnected.

Figure 8:
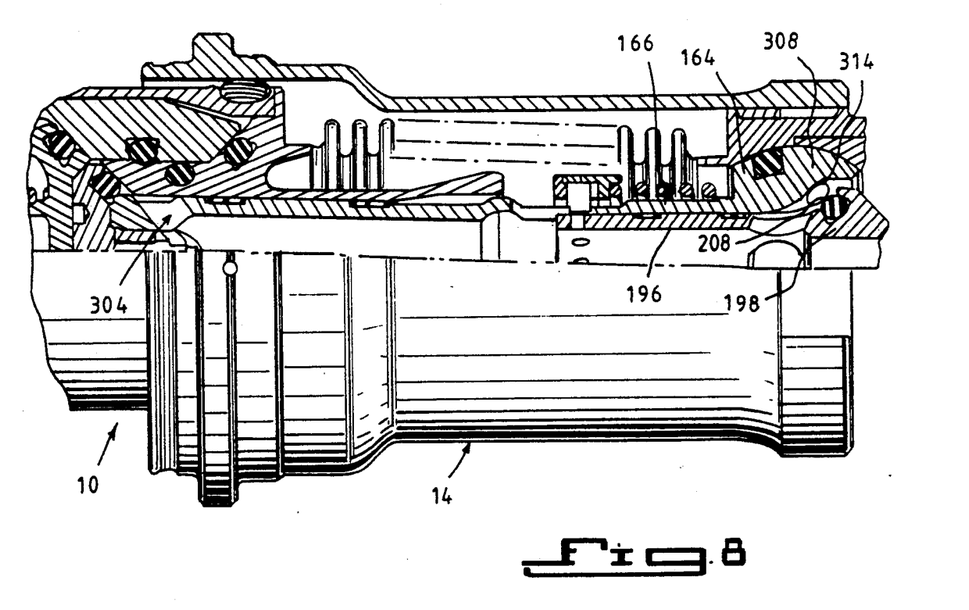
FIG. 8 is an enlarged view of a portion of the other coupling assembly illustrated in FIG. 4 illustrating the malfunction of one of the poppet valves.

FIG. 8 is an enlarged view of the primary and secondary poppet valves 304 and 308 of the female coupling assembly 14 illustrated in FIG. 4. As illustrated in FIG. 8, a particle of some type of foreign matter 312 has lodged between the sealing surface 208 on the interior of the head portion 164 of the poppet seat member 166 and the adjacent surface of the head 198 of the poppet member 196. Consequently, the secondary poppet valve 308 of the female coupling assembly 14 is kept open by the particle of foreign matter 314. However, since both the primary and the secondary poppet valves 304 and 308 are functionally independent, the primary poppet valve 304 will still function and the female coupling assembly 14 will function as intended to stop the flow of fluid when it is disconnected. In the same manner, if the particle of foreign matter 312 lodges in the primary poppet valve 304, the independent secondary poppet valve 308 will function as intended and will close when the female coupling assembly 14 is disconnected and consequently, the female coupling assembly 14 will function as intended even though its primary poppet valve 304 is kept open by the particle of foreign matter 312.

It should be noted, as illustrated in FIG. 4, that the location of the swivel member 22 of the male coupling assembly 12 that rotates about the point of rotation designated $R_1$ and its equivalent in the female coupling assembly 14 which is the head portion 164 with its spherical surface 162 that rotates about the point of rotation $R_2$ provide the redundant valve coupling 10 with its unique capability to accommodate rather large misalignment of the male coupling assembly 12 and the female coupling assembly and yet be coupled without any difficulties. In this connection, it should be noted that the swivel member 22 and its pivot point $R_1$ of the male coupling assembly 12 are located well to the rear of the outer end of the coupling assembly 12 that is adapted to be coupled to the female coupling assembly 14 and adjacent the inner end portion of the male coupling assembly 12. The same is true of the head portion 164 with its point or rotation $R_2$ that are also located well to the rear of the outer end of the coupling assembly 14 that is adapted to be coupled to the male coupling assembly 12 and adjacent the inner end portion of the female coupling assembly 14. In the case of the male coupling assembly 12, the point of rotation $R_1$ is located to the rear of both of the poppet valves 302 and 306 and in the case of the female coupling assembly 14 the point of rotation $R_2$ is located to the rear of the primary poppet valve 304 and substantially at the location of the secondary poppet valve 308.

It should also be noted that both the primary and secondary poppets 302 and 306 of the male coupling assembly 12 pivot or rotate about the point of rotation $R_1$ since they are connected to and rotate with the swivel member 22 and also both the primary and secondary poppets 30 and 308 of the female coupling assembly 14 pivot or rotate about the point of rotation $R_2$ since they are connected to and rotate with the head portion 164. These features plus the rearward locations of $R_1$ and $R_2$ and the respective bellows 50 and 274 and the respective compressible garter spring 68 and 264 permit a rather large rotation of the respective primary poppet valves 302 and 304 and associated structure and consequently allow for the previously described large amount of misalignment of the male and female coupling assemblies 12 and 14.

In the preferred embodiment, the redundant valve coupling 10 is manufactured primarily from a high grade stainless steel using suitable machining and other techniques that are well known in the art. Of course, the various O-rings will be made from a suitable flexible material known in the art and the, various slip rings should be made from polytetrafluoroethylene or its equivalent.

Although the invention has been described in considerable detail with references to a certain preferred embodiment, it will be understood and appreciated that various variations or modifications may be made within the spirit and scope of the invention as defined in the appended claims.

What is claimed is:

1. A fluid coupling comprising a pair of coupling members adapted to engage each other substantially along an axis and to permit fluid flow between the coupling members when they are engaged, at least one of said coupling members comprising a body having a long axis, a plurality of spaced apart valve seats located in said body, a plurality of independent reciprocating valve members located within said body for reciprocal movement substantially along the long axis of said body and positioned to make sealing contact with said spaced apart valve seats located in said body, means associated with said reciprociating valve members and said valve seats for urging said reciprocating valve members and the sealing surfaces of said valve seats into contact when said pair of coupling members are disconnected, means for moving said independent valve members and associated spaced apart valve seats out of contact with each other when said pair of coupling members engage each other and means located in said body for permitting rotational movement of said plurality of spaced apart valve seats and said plurality of independent reciprocating valve members when said pair of coupling members are engaging each other whereby misalignment between said pair of coupling members during engagement can be accommodated.

2. The fluid coupling of claim 1 wherein said means for permitting rotational movement of said plurality of spaced apart valve seats and said independent valve members comprises means for rotationally moving all of said valve seats and independent valve members together.

3. The fluid coupling of claim 2 wherein said means for urging said reciprocating valve members and the sealing surfaces of said valve seats into contact when said pair of coupling members are disconnected comprises means for independently urging said independent valve members and the sealing surfaces of said associated valve seats into contact in order that the failure of one valve member and associated valve seat will not affect the operation of any other valve member and associated valve seat.

4. The fluid coupling of claim 3 wherein said other coupling of said pair of couplings comprises a body having a long axis, a plurality of spaced apart valve seats located in said body, a plurality of independent reciprocating valve members located within said body for reciprocal movement substantially along the long axis of said body and positioned to make sealing contact with said spaced apart valve seats located in said body, means associated with said reciprocating valve members and said valve seats for independently urging said reciprocating valve members and the sealing surfaces of said valve seats into contact when said pair of coupling members are disconnected in order that the failure of one valve member and associated valve seat will not affect the operation of any other valve member and associated valve seat, means for moving said independent valve members and associated spaced apart valve seats out of contact with each other when said pair of coupling members engage each other and means located in said body for permitting rotational movement of all of said plurality of spaced apart valve seats and all of said plurality of independent reciprocating valve members together when said pair of coupling members are engaging each other whereby misalignment between said pair of coupling members during engagement can be accommodated.

5. A fluid coupling comprising a pair of coupling members adapted to engage each other substantially along an axis and to permit fluid flow between the coupling members when they are engaged, at least one of said coupling members comprising a body having a long axis, a plurality of spaced apart valve seats located in said body, a plurality of independent reciprocating valve members located within said body for reciprocal movement substantially along the long axis of said body and positioned to make sealing contact with said spaced apart valve seats located in said body, means associated with said reciprocating independent valve members and said valve seats for independently urging said reciprocating valve members and the associated sealing surfaces of said valve seats into contact when said pair of coupling members are disconnected in order that the failure of one valve member and associated valve seat will not affect the operation of any other valve member and associated valve seat, means for moving said independent valve members and associated spaced apart valve seats out of contact with each other when said pair of coupling members engage each other and means located in said body for permitting rotational movement of at least one of said plurality of spaced apart valve seats and of at least one of said plurality of independent reciprocating valve members when said pair of coupling members are engaging each other whereby misalignment between said pair of coupling members during engagement can be accommodated.

6. The fluid coupling of claim 5 wherein said other coupling of said pair of couplings comprises a body having a long axis, a plurality of spaced apart valve seats located in said body, a plurality of independent reciprocating valve members located within said body for reciprocal movement substantially along the long axis of said body and positioned to make sealing contact with said spaced apart valve seats located in said body, means associated with said reciprocating valve members and said valve seats for independently urging said reciprocating valve members and the sealing surfaces of said valve seats into contact when said pair of coupling members are disconnected in order that the failure of one valve member and associated valve seat will not affect the operation of any other valve member and associated valve seat, means for moving said independent valve members and associated spaced apart valve seats out of contact with each other when said pair of coupling members engage each other and means located in said body for permitting rotational movement of at least one of said plurality of spaced apart valve seats and at least one of said plurality of independent reciprocating valve members together when said pair of coupling members are engaging each other whereby misalignment between said pair of coupling members during engagement can be accommodated.

7. The fluid coupling of claim 5 wherein said coupling members have projecting engaging portions with engaging surfaces and wherein the engaging surface of at least one of said projecting portions has a plurality of spaced apart sealing means for creating a fluid tight seal between the engaging surfaces of said projecting engaging portions.

8. The fluid coupling of claim 7 wherein said sealing means comprises an O-ring.

* * * * *